US007082813B2

(12) United States Patent
Grosse-Bley et al.

(10) Patent No.: US 7,082,813 B2
(45) Date of Patent: Aug. 1, 2006

(54) TEST GAS LEAKAGE DETECTOR

(75) Inventors: Werner Grosse-Bley, Bonn (DE); Thomas Bohm, Cologne (DE); Ralf Hirche, Cologne (DE)

(73) Assignee: Inficon GmbH (DE)

( * ) Notice: Subject to any disclaimer, the term of this patent is extended or adjusted under 35 U.S.C. 154(b) by 76 days.

(21) Appl. No.: 10/496,718

(22) PCT Filed: Nov. 12, 2002

(86) PCT No.: PCT/EP02/12601

§ 371 (c)(1),
(2), (4) Date: May 21, 2004

(87) PCT Pub. No.: WO03/042651

PCT Pub. Date: May 22, 2003

(65) Prior Publication Data

US 2005/0066708 A1    Mar. 31, 2005

(30) Foreign Application Priority Data

Nov. 15, 2001   (DE) ............................. 101 56 205

(51) Int. Cl.
*G01M 3/04* (2006.01)
(52) U.S. Cl. ............................................ 73/40.7
(58) Field of Classification Search .................. 73/40.7
See application file for complete search history.

(56) References Cited

U.S. PATENT DOCUMENTS

| | | | | |
|---|---|---|---|---|
| 3,520,176 A | * | 7/1970 | Becker | 73/40.7 |
| 3,690,151 A | * | 9/1972 | Briggs | 73/40.7 |
| 4,472,962 A | * | 9/1984 | Mennenga | 73/40.7 |
| 4,487,058 A | * | 12/1984 | Mennenga | 73/40.7 |
| 4,499,752 A | * | 2/1985 | Fruzzetti et al. | 73/40.7 |
| 4,773,256 A | * | 9/1988 | Saulgeot | 73/40.7 |
| 4,779,449 A | * | 10/1988 | Bley et al. | 73/40.7 |
| 4,845,360 A | * | 7/1989 | Landfors | 250/288 |
| 4,893,497 A | * | 1/1990 | Danielson | 73/40.7 |
| 4,983,829 A | * | 1/1991 | Burger | 250/282 |
| 4,984,450 A | * | 1/1991 | Burger | 73/40.7 |
| 5,010,761 A | * | 4/1991 | Cohen et al. | 73/40.7 |
| 5,049,168 A | * | 9/1991 | Danielson | 95/31 |
| 5,297,422 A | * | 3/1994 | Baret | 73/40.7 |
| 5,341,671 A | * | 8/1994 | Baret et al. | 73/40.7 |
| 5,537,857 A | * | 7/1996 | Grosse Bley | 73/40.7 |

(Continued)

FOREIGN PATENT DOCUMENTS

DE    3144503 A1   *   5/1983

(Continued)

*Primary Examiner*—Hezron Williams
*Assistant Examiner*—John Fitzgerald
(74) *Attorney, Agent, or Firm*—Peter J. Bilinski

(57) ABSTRACT

A test gas leakage detector includes an inlet for gases to be analyzed for the presence of a test gas, a test gas detector and a first high vacuum pump connected to the test gas detector. An intermediate inlet is arranged on the first high vacuum pump that is used to supply the gases to be analyzed for the presence of a test gas. A fore-vacuum pump is connected to the first high vacuum pump and a line section fitted with a valve is located between the inlet and the fore-vacuum pump. In order to provide greater sensitivity and a quicker result time, a second high vacuum pump is provided between the inlet and the intermediate inlet. The second high vacuum pump has an outlet which is connected to the inlet of the fore-vacuum pump by means of a line section fitted with a valve.

10 Claims, 1 Drawing Sheet

U.S. PATENT DOCUMENTS

| | | | |
|---|---|---|---|
| 5,561,240 A * | 10/1996 | Ochiai et al. | 73/40.7 |
| 5,585,548 A * | 12/1996 | Grosse Bley et al. | 73/40.7 |
| 5,756,881 A * | 5/1998 | Stockli et al. | 73/40.7 |
| 5,821,404 A * | 10/1998 | Bohm et al. | 73/40.7 |
| 5,880,357 A * | 3/1999 | Bohm | 73/40.7 |
| 5,900,537 A * | 5/1999 | Bohm et al. | 73/40.7 |
| 5,907,092 A * | 5/1999 | Bohm | 73/40.7 |
| 5,974,864 A * | 11/1999 | Bohm | 73/40.7 |
| 6,021,663 A * | 2/2000 | Bohm | 73/40.7 |
| 6,282,946 B1 * | 9/2001 | Gevaud et al. | 73/40.7 |
| 6,415,650 B1 * | 7/2002 | Bohm et al. | 73/40.7 |
| 2005/0066708 A1 * | 3/2005 | Grosse-Bley et al. | 73/40.7 |

FOREIGN PATENT DOCUMENTS

| | | |
|---|---|---|
| EP | 0 344 345 A1 | 12/1989 |
| EP | 0 475 246 A1 | 3/1992 |

* cited by examiner

TEST GAS LEAKAGE DETECTOR

FIELD OF THE INVENTION

The present invention relates to a test gas leakage detector.

BACKGROUND OF THE INVENTION

In leakage detectors termed counterflow leakage detectors since the test gas enters into a high vacuum pump system (one or several series connected high vacuum pumping stage(s), preferably friction pumping stages) through an intermediate inlet, and flows upstream against the pumping action of the pump system towards the test gas detector. Leakage detection is performed such that the inlet of the instrument is connected to a unit under test, for example, being sprayed from the outside with test gas. In the instance of a leakage being present, the test gas penetrates into the unit under test and is detected with the aid of the test gas detector. A test chamber may also be connected to the inlet of the leakage detector in which one or several test gas containing units under test are accommodated. During the leakage detection process and in the instance of one or of several objects under test being leaky, test gas enters into the test chamber and is detected with the aid of the test gas detector. The vacuum leakage detection process detailed, may be performed qualitatively or quantitatively. As the test gas, helium has been found well-proven.

From U.S. Pat. No. 4,472,962 a leakage detector of the here affected kind is known. A test chamber is connected to its inlet. Evacuation of the test chamber is performed through the fore-vacuum pump which is necessary for operating the high vacuum pump system being implemented by way of a turbomolecular vacuum pump. During the leakage detection process, the gas which is to be analysed for the presence of the test gas is supplied to an intermediate inlet at the turbomolecular pump.

SUMMARY OF THE INVENTION

It is the task of the present invention to improve a leakage detector according to the state-of-the-art regarding speed and sensitivity of leakage detection.

This task is solved through the present invention through the characterizing features of the patent claims. Through the utilisation of an additional high vacuum pump (e.g., a booster pump) it is achieved that the test chamber connected to the inlet of the leakage detector, respectively the unit under the test connected to the inlet, can be tested at shorter response times, since the response time is dependent on the time constant=$V/S_{He}$. V=volume of the unit under test, $S_{He}$=pumping capacity of the booster pump for He. In spite of the high pumping capacity of the booster pump (11), detection sensitivity is maintained at a high level since it is only dependent on the high vacuum pump system and the design of its counterflow stages. Through the utilisation of a relatively large fore-vacuum pump the evacuation time is short, which in addition is achieved through a relatively high switchover pressure upon switching over to the booster pump.

Surprisingly it has been demonstrated that not only the sensitive, but also the prior gross and fine leakage detection steps can be performed with an open connection between the outlet of a further high vacuum pump and the intermediate inlet at the high vacuum pump system. For this reason this connection can be held open permanently. The installation of valves can be dispensed with. Continuous measurement operations ranging from gross to high sensitivity leakage detection are possible.

Further advantages and details of the present invention shall be explained with reference to an example of an embodiment for a leakage detector according to the present invention depicted in the drawing figure.

DETAILED DESCRIPTION

Figure 1:
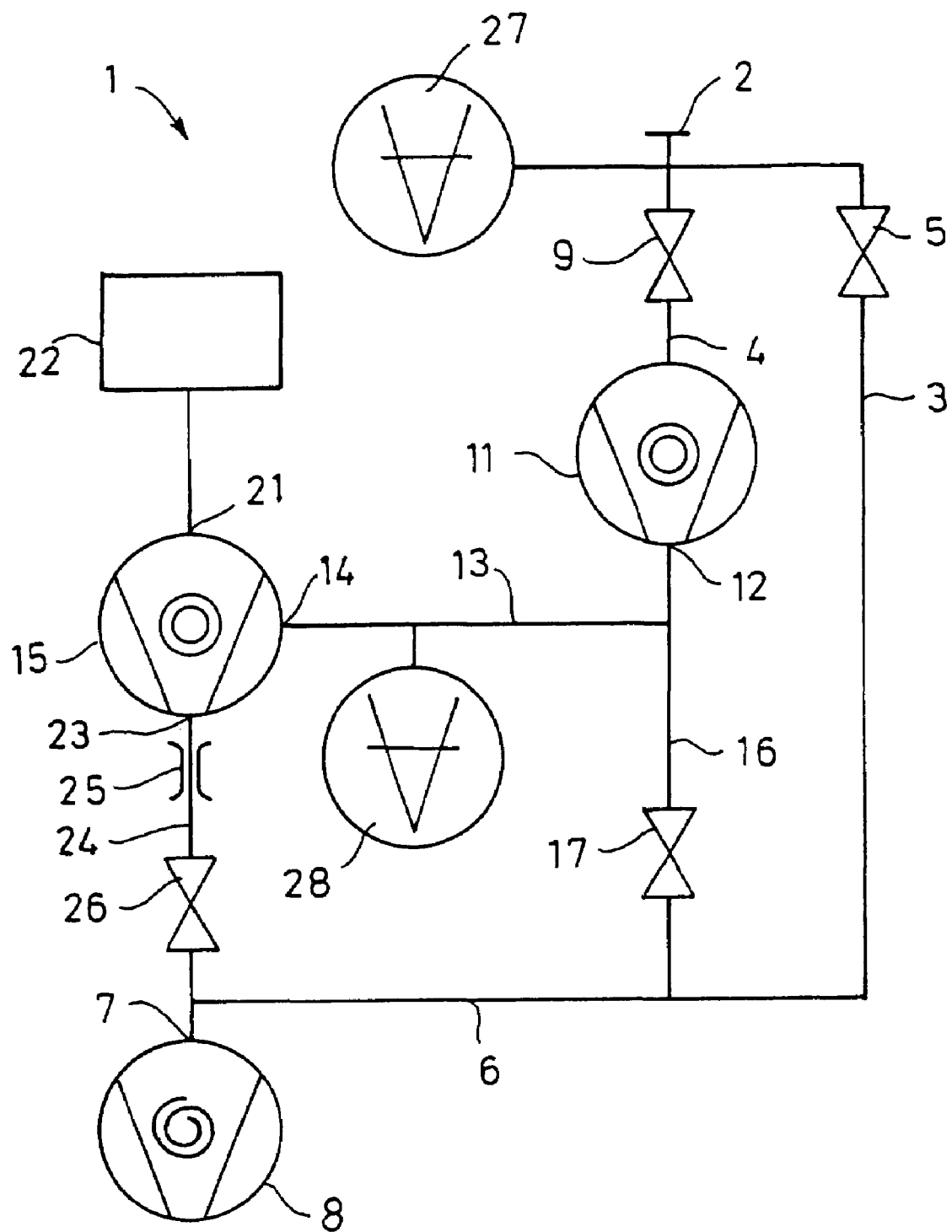
FIG. 1 illustrates a schematic drawing of the test gas leak detector according to the present invention.

FIG. 1 schematically depicts the components of a leakage detection instrument 1, the inlet of which is designated as 2. Connected to the inlet 2 are two line sections 3 and 4. Line section 3 is equipped with a valve 5 and is linked through the line section 6 to the inlet 7 of a fore-vacuum pump 8. Located in the line 4 is a valve 9 and a high vacuum pump 11 (e.g., booster pump), the outlet 12 of which is connected through a constantly open line section 13 to an intermediate inlet 14 at a second high vacuum pump 15. The outlet 12 of the high vacuum pump 11 is, moreover, connected via line sections 16—with valve 17—and 6 to the inlet 7 of the fore-vacuum pump 8.

The high vacuum pump 15 is the leakage detection pump into which the test gas flows—at least section-wise—against the direction of its pumping action. Connected at its inlet 21 is the test gas detector 22—when employing helium as the test gas, preferably a mass spectrometer. The outlet of said high vacuum pump 23 is connected via the line section 24 to the inlet 7 of the fore-vacuum pump 8. In line section 24 there is present—in the direction of the flow—a throttle 25 and a valve 26, which may also be designed by way of a single component (valve of a small nominal width, for example).

Two pressure gauges 27 and 28 supply information on the inlet pressure (gauge 27) and the pressure at the intermediate inlet 14 (gauge 28). With the aid of the supplied pressure signals, leakage detection operation is controlled. A controller and the corresponding lines are not depicted.

After connecting a unit under test to the inlet 2, the unit under test is initially pre-evacuated. During this phase all valves—with the exception of valve 5—are closed. Already after a short period of time (inlet pressure a few mbar, depending on the properties of the pump 15) the valve 26 may be opened. Should be unit under test exhibit a gross leak, test gas passes through valve 26, throttle 25 and high vacuum pump 15 (in a counterflow) to the detector 22 and is recorded.

The transition to fine leakage detection is performed in that valve 5 is closed and the valves 9 and 17 are opened. This step may already be performed at that point of time when the inlet pressure attains approximately the level which is necessary at the intermediate inlet (14) so as to just maintain the operating pressure in the test gas detector (mass spectrometer). In this state, the pumping capacity of the booster pump 11 is low, thus not effecting any detrimental pressure increase at the intermediate inlet. Moreover, during this phase the pumping capacity of the fore-vacuum pump 8 is still higher than the pumping capacity of the booster pump 11.

Should the unit under test exhibit smaller leaks, then these are detected (fine leakage detection).

With a progressing pressure decrease at inlet 2, the pumping capacity of the booster pump 11 increases, the unit under test is evacuated relatively rapidly to lower pressures. When the inlet pressure attains a level of $10^{-2}$ mbar, for example, high sensitivity leakage detection commences in that the valve 17 is closed. Test gas escaping through a possibly still present very small leakage in the unit under test enters entirely into the intermediate inlet 14 and is recorded by the mass spectrometer 22.

As a fore-vacuum pump 8, oil-sealed or dry (oil-free) pumps may be employed, expediently at pumping capacities $\geq 16$ m$^3$/h (i.e., relatively "large" pumps), due to the relatively large volumes of unit under test or test gas chamber. Throttle 25 has the effect of ensuring that the sensitivity for the leakage detection, dependent on $K_{TMP} \times S_{VVP}$ ($K_{TMP}$=compression of the leakage detection pump, $S_{VVP}$=pumping capacity of the fore-pump) does not diminish to a level being too low, although the fore-vacuum pump is "large".

The booster turbomolecular pump 11 should be selected such that it offers already at a high inlet pressure a significant pumping capacity. For the leakage detection pump 15 it is required, that it offers within the lower range a relatively high compression so as to isolate the unstable fore-vacuum pump. So-called compound pumps, i.e. friction vacuum pumps with a turbomolecular pumping stage on the intake side and a molecular pumping stage on the delivery side offer these properties.

An embodiment according to FIG. 1 may be implemented with special advantage through a speed controlled turbo pump 11 at the inlet 2 of the leakage detector 1. Whereas in the instance of the solution involving an uncontrolled rotational speed for the pump, the line 16 with the valve 17 is required so as to divert the occurring increased gas flow during the so-called "cross-over" (transition to fine leakage detection, opening of valve 9) into the fore-vacuum pump 8, line 16 and valve 17 can even be eliminated provided the speed of the booster TMP 11 is controlled at all times such that the condition not to exceed the pumping capacity of the pump 11 at the beginning of the "cross over" is fulfilled through the speed control.

This possibility exists only in the instance of a booster pump 11 located upstream of the inlet 14 of the counterflow detection system. In this instance, the pumping capacity at leakage detection inlet 2 (in contrast to a main flow leakage detector or a simple counterflow leakage detector) is not linked to the sensitivity defining pumping capacity of the high vacuum or fore-vacuum pump. The leakage gas flow must entirely flow through the pump 11 at every pumping capacity (every rotational speed).

Typically, the booster pump 11 will operate at a low "standby" speed as long as inlet valve 9 is closed. As soon as the inlet pressure drops below the level permissible for the valve-less intermediate inlet 14 of the counterflow pump, valve 5 is closed and valve 9 is opened. At this moment the effective pumping capacity of the booster pump 11 must be approximately equal to the present existent pumping capacity of the fore-pump 8, so that no pressure rise will occur affecting the fore-vacuum.

What is claimed is:

1. Test gas leakage detector, comprising:
    an inlet for gases to be analyzed for the presence of a test gas;
    a test gas detector;
    a first high vacuum pump connected to the test gas detector;
    an intermediate inlet arranged on the first high vacuum pump and used to supply the gases to be analyzed for the presence of a test gas;
    a fore-vacuum pump connected to said first high vacuum pump; and
    a first line section fitted with a valve, said first line section being located between the inlet and the fore-vacuum pump wherein a second high vacuum pump is provided between the inlet and the intermediate inlet, said second high vacuum pump having an outlet which is connected to the inlet of the fore-vacuum pump by means of a second line section fitted with a valve.

2. A detector according to claim 1, wherein a third line section between the outlet of the second high vacuum pump and the intermediate inlet is permanently open.

3. A detector according to claim 1, wherein the test gas detector is a mass spectrometer.

4. A detector according to claim 1, wherein the fore-vacuum pump has a pumping speed greater than or equal to about 16 m$^3$/h.

5. A detector according to claim 1, wherein at least one of the first and second high-vacuum pumps are designed by way of compound pumps.

6. A method for operating a test gas leakage detector according to claim 1, wherein initially the detector under test is evacuated via a line in which the valve located between the inlet for gases to be analyzed and the inlet of the fore-vacuum pump is opened and all other valves are closed, where at an inlet pressure of a few mbar a valve for initiating gross leakage detection is opened, said valve being disposed in a fourth line section between the outlet of said first high vacuum pump and the inlet of said fore-vacuum pump, where fine leakage detection commences at a pressure which corresponds approximately to the maximum inlet pressure at the intermediate inlet, in that respective valves interconnecting the fore-vacuum pump with the second high vacuum pump and the inlet and the second high vacuum pump are each opened and where at an inlet pressure of approximately $10_{-2}$ mbar, high sensitivity leakage detection commences in that the valve interconnecting the fore-vacuum pump with the second high vacuum pump is closed.

7. A detector according to claim 1, including a throttle and a valve located in a fourth line section between an outlet of the first high vacuum pump and the inlet of the fore-vacuum pump.

8. A detector according to claim 7, wherein the throttle and valve disposed in the fourth line section between the outlet of the first high vacuum pump and the inlet of the fore-vacuum pump are designed as a single component, said single component comprising a valve having a small nominal width.

9. A test gas leakage detector comprising:
    an inlet for gases to be analyzed for the presence of a test gas;
    a test gas detector;
    a first high vacuum pump connected to the test gas detector, said first high vacuum pump having an intermediate inlet arranged thereon that is used to supply the gases to be analyzed for the presence of a test gas;
    a fore-vacuum pump connected to said first high vacuum pump;
    a line section fitted with a valve that is located between the inlet for gases to be analyzed and the fore-vacuum pump; and
    a second high vacuum pump provided between the inlet and the intermediate inlet, said second high vacuum pump being a friction vacuum pump, the speed of said second high vacuum pump being adjustable for the purpose of adjusting the pressure in the area of its outlet.

10. Method for operating a test gas leakage detector according to claim 9, initially including the steps of evacuating the detector under test via a line, where at an inlet pressure of a few mbar, a valve for initiating gross leakage detection is opened, where a more sensitive leakage detection is initiated by opening of a valve between the inlet and the second high vacuum pump and where the rotational speed of the second high vacuum pump is controlled such that the maximum inlet pressure at the intermediate inlet, in particular the initiating fine leakage detection, is not exceeded.

* * * * *